Figure 1:
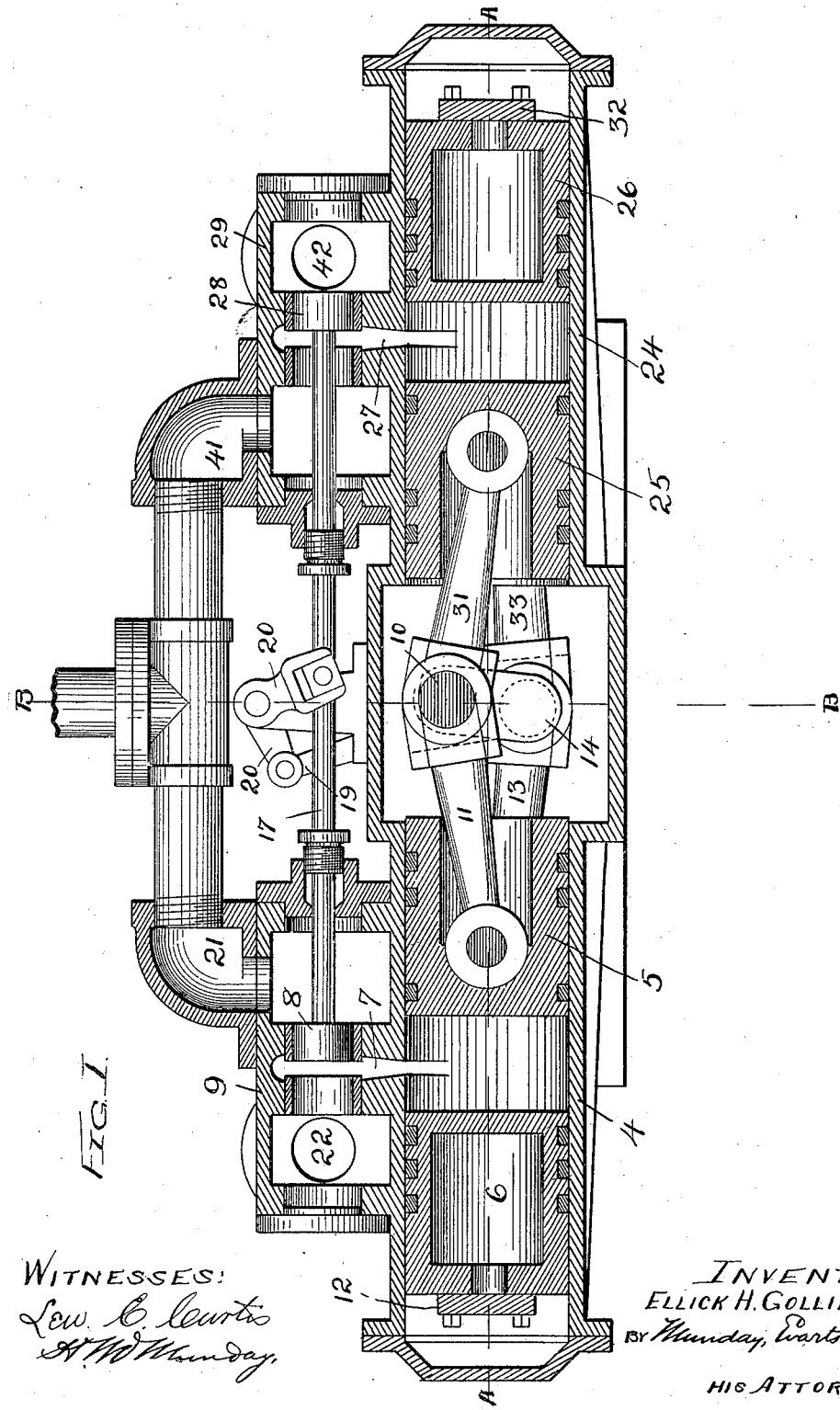

No. 655,775. Patented Aug. 14, 1900.
E. H. GOLLINGS.
STEAM ENGINE.
(Application filed Oct. 19, 1899.)

(No Model.) 3 Sheets—Sheet 1.

WITNESSES:
Lew. C. Curtis
H. W. Munday.

INVENTOR:
ELLICK H. GOLLINGS
By Munday, Evarts & Adcock
HIS ATTORNEYS

No. 655,775. Patented Aug. 14, 1900.
E. H. GOLLINGS.
STEAM ENGINE.
(Application filed Oct. 19, 1899.)

(No Model.) 3 Sheets—Sheet 2.

WITNESSES:
Lew. C. Curtis
H. W. Munday

INVENTOR:
ELLICK H. GOLLINGS
BY Munday, Evarts & Adcock.
HIS ATTORNEYS.

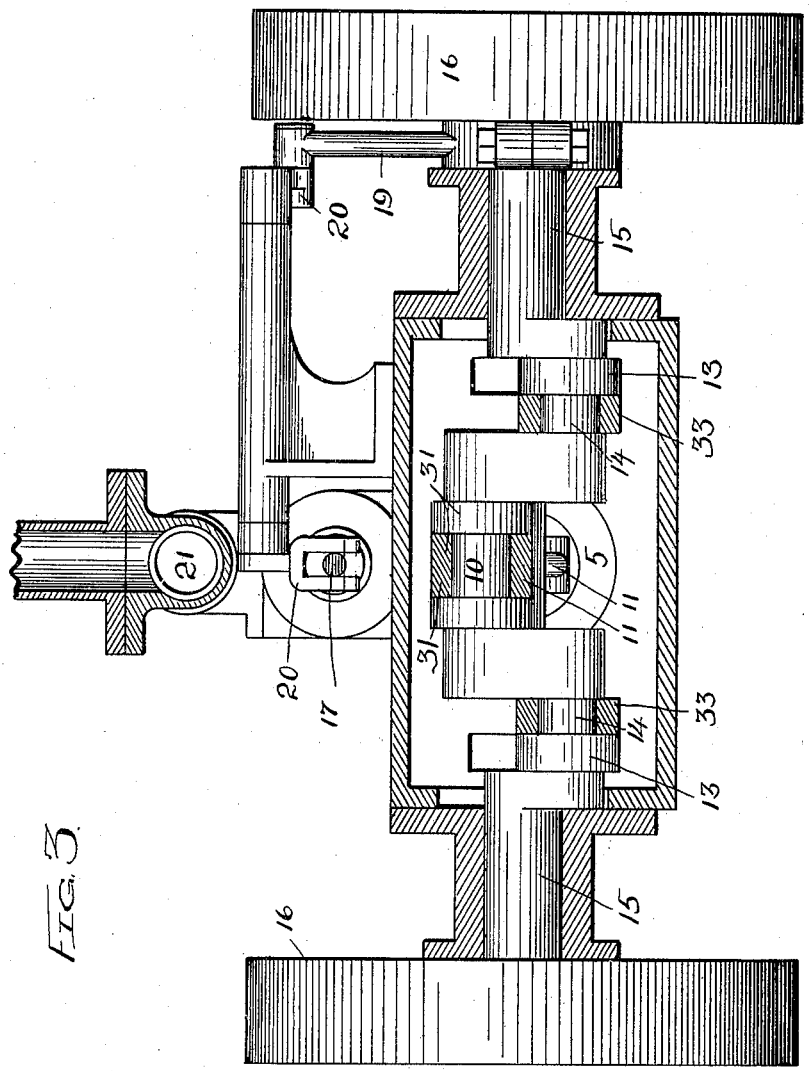

United States Patent Office.

ELLICK H. GOLLINGS, OF CHICAGO, ILLINOIS, ASSIGNOR TO HIMSELF AND JOHN HEWITT, OF SAME PLACE.

STEAM-ENGINE.

SPECIFICATION forming part of Letters Patent No. 655,775, dated August 14, 1900.

Application filed October 19, 1899. Serial No. 734,042. (No model.)

*To all whom it may concern:*

Be it known that I, ELLICK H. GOLLINGS, a citizen of the United States, residing in Chicago, in the county of Cook and State of Illinois, have invented a new and useful Improvement in Steam-Engines, of which the following is a specification.

This invention is an improved and perfectly-practicable construction of steam or gas engine capable of high speed without jarring, and obtaining a larger percentage of available power in proportion to the amount of steam or gas used than the commonly-used forms of engines.

In the ordinary engine much power is wasted because it is expended in moving complicated parts and in causing shocks to the engine itself, which shocks are commonly of two kinds. One kind occurs in the cylinder and is caused by the impact of the steam against the stationary head or heads of the cylinder. The other kind is caused by the thrust of the piston-rod and is usually resisted by the cross-head guides, or in some cases the connection between the piston and the crank is more indirect and embraces one or more levers pivoted to some stationary part of the engine, so that such stationary parts of the engine are compelled to resist the thrust, at least in part. The thrusts are also usually transmitted in one direction only to the crank, and the resistance of the load on the crank-shaft tends to constantly urge the shaft out of line and wear its bearings unevenly. All kinds of shocks are objectionable, not only because they consume power, but chiefly because they retard the motion and affect the stability of the engine and sooner or later so rack and injure it as to impair and eventually destroy its usefulness and necessitate the securing of the engine to a heavy foundation. I have found that if the shocks occurring in the cylinder are prevented, as they may be, and the thrusts of the piston are neutralized or counteracted at the crankshaft without transmitting any portion of them to a stationary part of the engine, an engine may be produced which will run at a speed exceeding five hundred revolutions per minute—such, for instance, as is required in operating dynamos—be economical in its use of steam, and be capable of long service by reason of its freedom from the disturbances occurring in previous constructions. To this end I employ two cylinders having no stationary abutments of any kind, and place in each cylinder two oppositely-moving single-acting pistons, the steam being admitted at the centers of the cylinders alternately and acting to force the pistons away from each other. Both the inner pistons are connected to the same crank of the shaft, and both outer pistons to oppositely-arranged cranks thereon, the connections being direct by means of combined piston-rods and pitmen and without any connection to the bed or frame or any stationary part of the engine, so that the entire thrust of all the pistons is borne by the crank-shaft and not by the bed or frame or any stationary part of the engine, and the pistons are directly connected to the crank-shaft, which lies between and transversely of the two cylinders, and no intermediate indirect connections—such as shafts, levers, &c.—are employed, and inasmuch as the thrusts of the two inner and two outer pistons come upon opposite sides of the cranks they balance one another, and thereby obviate the unequal wear of the bearings and the jarring. I have already built an engine of the kind here set forth, and have run it in excess of five hundred revolutions per minute without its being attached to any foundation, and it has remained perfectly steady and free from jars or vibrations, and has shown very high efficiency.

The invention therefore consists in the novel and improved construction of a double or duplex engine, as hereinafter described in detail and illustrated in the accompanying drawings, in which—

Figure 2:
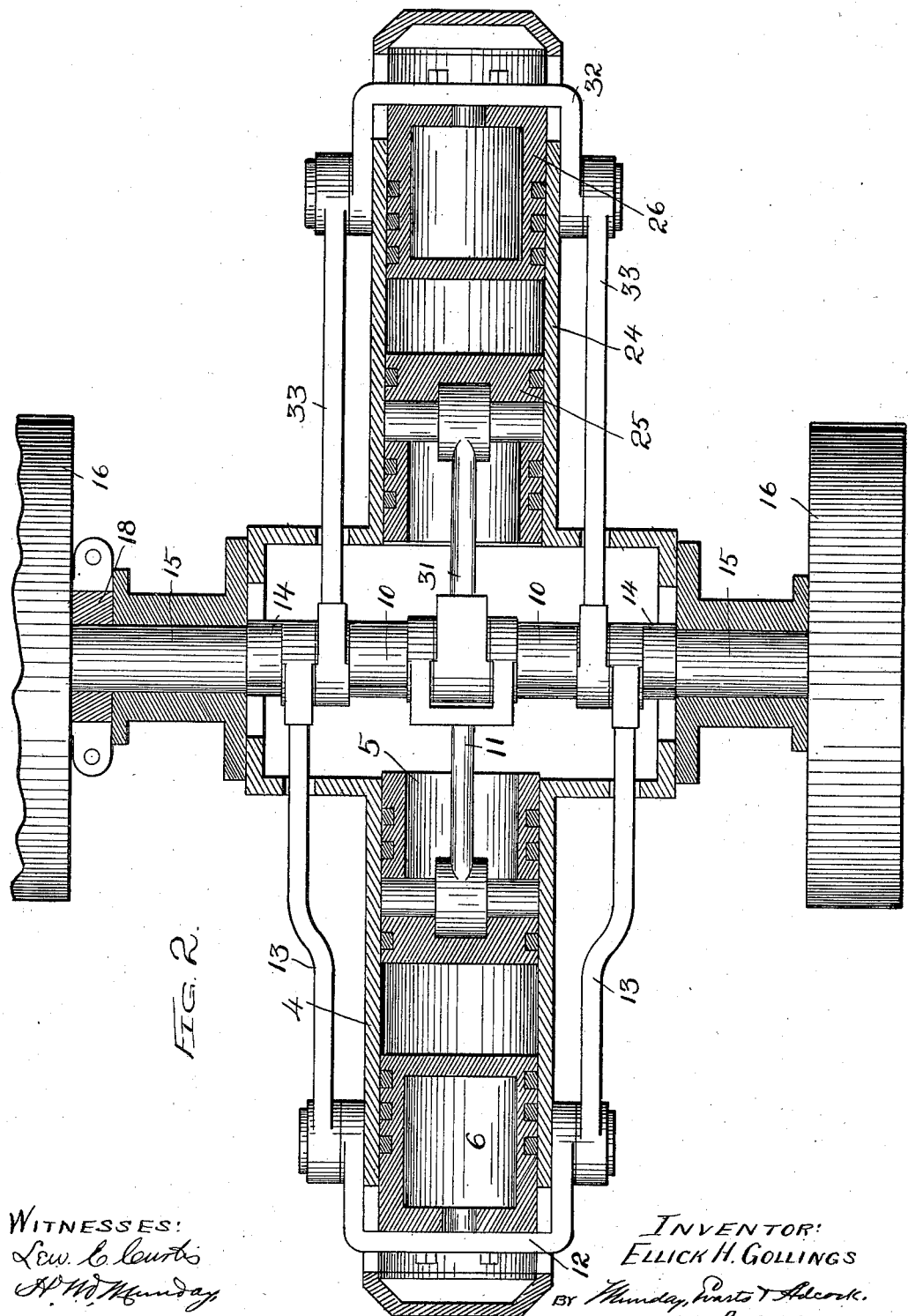

Figure 1 represents a longitudinal vertical section of my improved engine; Fig. 2, a longitudinal section of the engine on the line A A of Fig. 1, and Fig. 3 a transverse section on the line B B of Fig. 1.

In said drawings, 4 represents one of the cylinders, and 5 and 6 represent two oppositely-moving single-acting pistons in said cylinder. These pistons are made long enough to act as guides for the combined piston-rod pitmen 11 and 13. Steam is admitted to the cylinder between the pistons by a port 7, controlled by a valve 8 in the chest 9. The inner piston 5 is connected directly to the crank 10 by the pitman 11, and the outer piston 6 is provided with a yoke 12 at its outer end, the arms of which are outside the cylinder and are each pivotally connected to the pitman 13, which extends to and is joined to cranks 14. The drive-shaft is shown at 15, and these last-mentioned cranks are arranged upon the opposite side of it from the crank 10. The shaft may carry the usual fly wheel or wheels 16. The valve 8 is mounted on a sliding rod 17 and is actuated by an eccentric 18 on the drive-shaft, the rod 19 of which eccentric rocks a bell-crank lever 20, which is connected to the rod 17, as plainly indicated at Fig. 1. By this or other suitable means the valve is operated and controls the admission of the steam. The valve in one position admits the steam from the conduit 21 and closes the exhaust 22, and in the other it closes the inlet and opens the exhaust. At the opposite side of the drive-shaft is a cylinder 24, which, together with its pistons, valves, &c., is substantially like those already described, being shown at 25 and 26, and the steam port, valve, and chest at 27, 28, and 29, respectively. The inner piston 25 is connected to crank 10 by the pitman 31, and the outer piston 26 is provided with a yoke 32, similar to yoke 12, and the arms of such yoke are connected to the cranks 14 by pitmen 33 in the same manner as are the arms of yoke 12. The valve 28 is also mounted on rod 17 and controls the admission of steam from conduit 41 and its exhaustion through the outlet 42 in the same manner as in the case of valve 8.

In a double-cylinder engine like that shown the inner pistons both push on the crank 10 in alternation with each other, while the outer pistons both pull on cranks 14 in alternation with each other. The inner and outer pistons of each cylinder act simultaneously on their respective cranks and with corresponding power, so that the thrust of one piston is fully balanced and neutralized by that of the other piston, the cranks thus receiving and sustaining within themselves the entire force of the thrusts of both, but without any tendency being imparted to them or through them to the shaft to displace the latter or cause it to wear its bearings unequally.

It will be observed that in the construction shown there are no intermediate supports or connections employed between the pistons and the crank-shaft other than the pitmen—that is, there are no intermediate levers, rock-shafts, cross-head guides, &c., which require fulcrums, journal-bearings, or supports upon the main frame, the pitmen being supported directly and entirely by the pistons at one end and by the crank-shaft at the other. The steam is admitted alternately into the cylinders, so that two impulses are given the main shaft at each revolution thereof.

An important advantage attending my invention is that the pitmen always bear against the same side of the crank wrist-pins while working, so that it is rendered an easy matter to prevent any lost motion at the wrist-pins, and thus avoid a fruitful source of trouble in engines now in use.

By the construction as shown and described a perfectly-balanced compact simple engine is produced, which practically realizes the advantages above stated of the invention and gives that perfect balancing of moving parts whereby rapid steady running is insured, unattainable in single-cylinder engines, which I am now aware have been constructed embodying a double-crank shaft, an open-ended cylinder, a pair of oppositely-moving pistons in such cylinder, and pitmen connecting the pistons with opposite cranks of such shaft. Such single-acting single-cylinder engines I do not claim, as they are incapable of being balanced so as not to transmit jars to the main frame, and can give but one impulse to the main shaft for each revolution and do not embody my invention. I therefore disclaim such single-cylinder engines, and only claim herein the novel double-cylinder engine, substantially as herein shown and described.

Having thus described my invention, what I therefore claim as new, and desire to secure by Letters Patent, is—

1. In an engine, the combination of a crank-shaft, a pair of cylinders arranged at opposite sides of the crank-shaft, at right angles thereto; and a pair of pistons in each cylinder; with pitmen directly connecting both of the inner pistons to one crank of the shaft so that these pistons move alike and in the same direction; and pitmen directly connecting both of the outer pistons to another crank of the shaft so that the outer pistons also move alike and in the same direction; and means for admitting the actuating fluid between the pistons in the opposite cylinders, substantially as described.

2. In an engine, the combination of a pair of opposite cylinders; a crank-shaft lying transversely of and between said cylinders, and provided with oppositely-disposed cranks, and a pair of pistons in each cylinder; with pitmen directly connecting the inner pistons to one crank; pairs of pitmen having their outer ends connected to the outermost pistons, and their inner ends connected to the crank-shaft opposite the connections of the inner pistons thereto, whereby the inner pistons move together in the same direction and oppositely to the outer pistons which also move alike and in the same direction, and means for admitting the propelling fluid alternately between the pistons in the opposite cylinders, for the purpose and substantially as described.

3. In an engine, the combination of a pair of diametrically-opposite alined open-ended cylinders; a crank-shaft lying transversely of and between said cylinders, and provided with triple cranks, the inner crank being set opposite to the outer ones; with a pair of pistons in each cylinder; thrust-pitmen directly connecting the inner pistons to the central crank; pairs of pitmen having their outer ends directly connected to and supported by the outermost pistons, at each side of the cylinders, and their inner ends connected to the outermost cranks, whereby the inner pistons move together in the same direction and oppositely to the outer pistons which also move together and in the same direction; and means for admitting the propelling fluid between the pistons in the opposite cylinders, alternately, for the purpose and substantially as described.

ELLICK H. GOLLINGS.

Witnesses:
EDW. S. EVARTS,
H. M. MUNDAY.